United States Patent [19]

Boden

[11] 4,386,063

[45] * May 31, 1983

[54] FLAVOR USE OF MIXTURES CONTAINING 1-N-BUTOXY-1-ETHANOL ACETATE

[75] Inventor: Richard M. Boden, Monmouth Beach, N.J.

[73] Assignee: International Flavors & Fragrances Inc., New York, N.Y.

[ * ] Notice: The portion of the term of this patent subsequent to Oct. 20, 1998, has been disclaimed.

[21] Appl. No.: 292,394

[22] Filed: Aug. 13, 1981

Related U.S. Application Data

[63] Continuation-in-part of Ser. No. 217,810, Dec. 18, 1980, Pat. No. 4,296,138, which is a continuation-in-part of Ser. No. 176,111, Aug. 7, 1980, Pat. No. 4,296,137.

[51] Int. Cl.[3] .............................................. A23L 1/235
[52] U.S. Cl. ...................................... 424/49; 424/358; 426/3; 426/534; 426/535; 426/536
[58] Field of Search ................... 426/3, 534, 535, 536; 424/49, 358

[56] References Cited

U.S. PATENT DOCUMENTS

| | | | |
|---|---|---|---|
| 3,917,870 | 11/1975 | Slangan et al. | 426/535 |
| 4,296,137 | 10/1981 | Boden | 426/534 |
| 4,296,138 | 10/1981 | Boden | 426/534 |

*Primary Examiner*—Joseph M. Golian
*Attorney, Agent, or Firm*—Arthur L. Liberman

[57] ABSTRACT

Described for use in augmenting or enhancing the aroma or taste of foodstuffs, chewing gums, toothpastes and medicinal products are mixtures of (a) 1-n-butoxy-1-ethanol acetate having the structure:

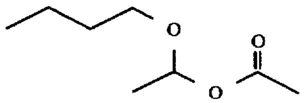

and (b) 2-phenyl-3-carboethoxyfuran having the structure:

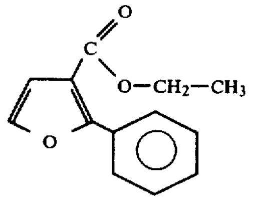

and/or (c) bis (cyclohexyl) disulfide having the structure:

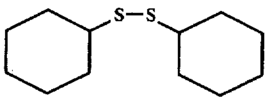

4 Claims, No Drawings

FLAVOR USE OF MIXTURES CONTAINING 1-N-BUTOXY-1-ETHANOL ACETATE

This application is a continuation-in-part of application for United States Letters Patent, Ser. No. 217,810 filed on Dec. 18, 1980 now U.S. Pat. No. 4,296,138 issued on Oct. 20, 1981, which, in turn, is a continuation-in-part of application for United States Letters Patent, Ser. No. 176,111 filed on Aug. 7, 1980 now U.S. Pat. No. 4,296,137 issued on Oct. 20, 1981.

BACKGROUND OF THE INVENTION

This invention relates to a novel method of fixing acetaldehyde in grape flavors and producing novel grape flavored consumable materials by means of the formation of 1-n-butoxy-1-ethanol acetate which acts as a generator responding to conditions of use in grape flavored food products to yield acetaldehyde, in conjunction with 2-phenyl-3-carboethoxyfuran and/or bis(-cyclohexyl)disulfide. This invention also relates to the use of 1-n-butoxy-1-ethanol acetate having the structure:

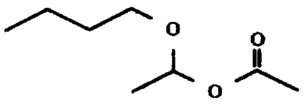

in flavors in-combination with 2-phenyl-3-carboethoxyfuran having the structure:

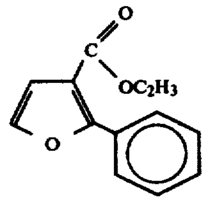

and/or bis(cyclohexyl)disulfide having the structure:

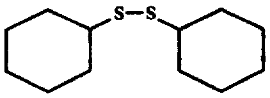

taken alone or combined further in carbohydrates such as cyclic dextrins to generate acetaldehyde and, at the same time, augment or enhance "grape" flavors.

There has been considerable work performed relating to substances which can be used to impart (or enhance) flavors to (or in) various consumable materials. These substances are used to diminish natural materials, some of which may be in short supply, and to provide more uniform properties in the finished product. Concord grape, wine incense/fruity, pungent, sulfury (berry), minty, musty, weak sweet buttery, sweet carrot, dry woody cinnamon or warm benzaldehye-nut like flavor notes or combinations of these and bitter after taste, benzoate-ester taste and heavy floral backnotes for improving the taste and aroma of artificial grape or other fruity flavoring compositions are particularly desirable for many uses in consumable articles, e.g., foodstuffs.

In U.S. Pat. No. 3,677,772 sulfide derivatives suitable for use in meat flavors are represented by the following structural formula:

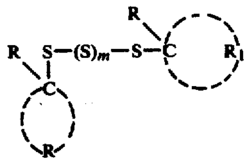

wherein R represents hydrogen or lower alkyl of 1 to 6 carbon atoms and $R_1$ represents the carbon atoms necessary to complete a cycloalkyl group, containing from 4 to 9 intracyclic carbon atoms and m is 1 or 2.

Also disclosed in U.S. Pat. No. 3,677,772 is the formulation of cycloalkyl mercaptans in situ with the remaining ingredients of the flavoring or foodstuff composition carried out by employing as the precursor, a mercaptal and/or hemimercaptal capable of yielding the desired cycloalkyl mercaptan by simple hydrolysis, e.g., at refluxing temperatures. Particularly described as suitable for such use is the mercaptal formed on the addition of acetaldehyde to cyclopentyl mercaptan, such mercaptal having the following structural formula:

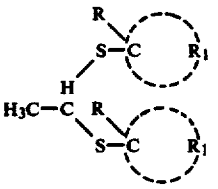

wherein R and $R_1$ have the aforedescribed significance.

As mentioned on page 442 of "The Chemistry and Physiology of Flavors" (Schultz, Day and Libbey, Avi Publishing Company, 1967), 2-acetylfuran is present in coffee flavors. On pages 218 and 219 of the same publication, ethyl phenyl acetate and 2-phenethyl caproate are mentioned as being one of the volatile esters of wine aroma.

Bis(cyclohexyl)disulfide is prepared according to the process set forth in U.S. Pat. No. 2,517,934 issued Aug. 8, 1950.

2-Phenyl-3-carboethoxyfuran is prepared according to the process set forth by I. H. Kondo and H. Suzuki in J.Pharm.Soc. Japan No. 544,501-5(1927).

In addition, it was indicated in U.S. Pat. No. 3,917,870 issued on Nov. 4, 1975 that solid and liquid foodstuff and flavoring compositions having concord grape, wine, incense/fruity, pungent, sulfuryberry, minty, musty, weak sweet buttery, sweet carrot, dry woody cinnamon or warm benzaldehyde-nut like flavor notes or combinations of these and bitter after taste, benzoate-ester taste and heavy floral backnotes for improving the taste and aroma of artificial grape or other fruit flavoring compositions can be created by the utilization of 2-phenyl-3-carboethoxyfuran and/or bis(cyclohexyl)disulfide in flavor formulae and/or in foodstuffs.

Nothing in the prior art and none of the acetaldehyde precursors either those of German Offenlegungschrift No. 2,802,821 or those of U.S. Pat. No. 3,141,184 teaches that an advantageous flavor and aroma impact be created as a result of using inconjunction with 2-phenyl-3-carboethoxyfuran and/or bis(cyclohexyl)disulfide, 1-n-butoxy-1-ethanol acetate having the structure:

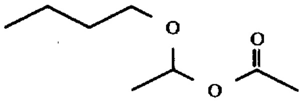

whether used alone or whether it is combined with an absorbing solid such as acyclic dextrin.

THE INVENTION

In application for U.S. patent Ser. No. 217,810 filed on Dec. 18, 1980 now U.S. Pat. No. 4,296,138 issued on Oct. 20, 1981, it was indicated that 1-n-butoxy-1-ethanol acetate is capable of imparting a variety of flavors and fragrances to various consumable materials and is also capable of augmenting or enhancing a variety of flavors and fragrances in the various consumable materials. It has now been determined that a combination of 1-n-butoxy-1-ethanol acetate is capable of augmenting or enhancing the aroma and/or taste of grape flavors when used in combination with 2-phenyl-3-carboethoxyfuran and bis(cyclohexyl)disulfide wherein, the 2-phenyl-3-carboethoxyfuran has the structure:

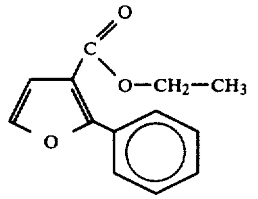

and wherein, the bis(cyclohexyl)disulfide has the structure:

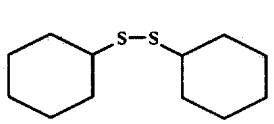

Briefly, my invention contemplates augmenting or enhancing the flavor of foodstuffs' chewing gums, toothpastes and medicinal products by adding thereto a small but effective amount of a mixture of (a) 1-n-butoxy-1-ethanol acetate having the structure:

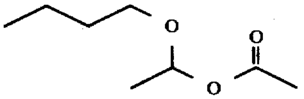

and (b) either or both of 2-phenyl-3-carboethoxyfuran and/or bis(cyclohexyl)disulfide with the proportion of 1-n-butoxy-1-ethanol acetate:2-phenyl-3-carboethoxyfuran and/or bis(cyclohexyl)disulfide being from 0.1:1 up to 1:0.1 and wherein when the 2-phenyl-3-carboethoxyfuran and bis(cyclohexyl)disulfide are used together, the ratio of 2-phenyl-3-carboethoxyfuran:bis(cyclohexyl)disulfide is preferably in the range of 1.5:0.02 up to about 1.5:0.15, the bis(cyclohexyl)disulfide being the more potent of the two chemical compounds with regard to their respective organoleptic characteristics in food compositions. It is noteworthy, that when the three materials, 1-n-butoxy-1-ethanol acetate, 2-phenyl-3-carboethoxyfuran and bis(cyclohexyl)disulfide are used in combination with one another rather than using the 1-n-butoxy-1-ethanol acetate only in combination with either the 2-phenyl-3-carboethoxyfuran or the bis(cyclohexyl)disulfide a more natural grape flavor is imparted to foodstuffs, chewing gums, toothpastes and medicinal products.

The 1-n-butoxy-1-ethanol acetate of my invention may be prepared according to processes well known in the priort art, for example, according to the reaction:

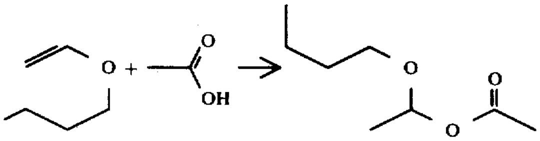

Such a process is more specifically pointed out in the articles by Shostakovskii, Gershstein, Bogdanova and Shishkov, Akad, Nauk, SSSR, Inst. Org. Khim., Sintezy Org. Soedinenii Sbornik, 2 25-8 (1952) (abstracted in Chem. Abstracts Volume 48, column 579h).

The 1-n-butoxy-1-ethanol acetate of my invention can be obtained in pure form, or in substantially pure form by conventional purification techniques. Thus, the products can be purified and/or isolated by distillation, preparative chromatographic techniques (column chromatography and vapor phase chromatography) and the like. It has been found desirable to purify the 1-n-butoxy-1-ethanol acetate of my invention by fractional distillation in vacuo.

When used as a food flavor or food additive or enhancer or medicinal product flavor or medicinal product additive or enhancer or chewing gum flavor or chewing gum additive or enhancer or toothpaste flavor or toothpaste additive or enhancer, the organoleptic properties of the combination 1-n-butoxy-1-ethanol acetate and 2-phenyl-3-carboethoxyfuran and/or bis(-cyclohexyl)disulfide of my invention give rise to an intense concord grape-like taste with sulfury-berry under tones and natural winey nuances (in the vermouth area).

When the combination: 1-n-butoxy-1-ethanol acetate and 2-phenyl-3-carboethoxyfuran and/or bis(cyclohexyl)disulfide of my invention is used as a food flavor adjuvant, the nature of the co-ingredients included with said combination: 1-n-butoxy-1-ethanol acetate and 2-phenyl-3-carboethoxyfuran and/or bis(cyclohexyl)disulfide in formulating the product composition will also serve to alter the organoleptic characteristics of the ultimate foodstuffs treated therewith. As used herein in regard to flavor, the term "alter" in its various forms means "supplying or imparting flavor character or note to otherwise bland, relatively tasteless substance or augmenting or enhancing the existing flavor characteristic where a natural flavor is deficient in some regard or supplementing the existing flavor impression to modify its quality, character or taste". As used herein, the term "foodstuff" includes both solid and liquid ingestible materials which usually do, but need not have nutritional value. Thus, foodstuffs include convenience foods, beverages, dairy products, candies, soft drinks, snacks, chewing gum, chewable vitamin tablets and the like.

Substances suitable for use herein as coingredients or flavoring adjuvants are well known in the art for such use being extensively described in the relevant literature. Apart from the requirement that any such material be "ingestibly" acceptable and thus non-toxic or otherwise non-deleterious nothing particularly critical resides in selection thereof. Accordingly, such materials which may in general be characterized as flavoring adjuvants or vehicles comprise boardly stabilizers, thickeners, surface active agents, conditioners, other flavorants and flavor intensifiers.

Stablizier compounds include preservatives, e.g., sodium chloride, antioxidants, e.g., calcium and sodium ascorbate, ascorbic acid, butylated hydroxyanisole (mixture of 2- and 3-tertiary-butyl-4-hydroxyanisole), butylated hydroxy toluene (2,6-di-tertiarybutyl-4-methyl phenol), propyl gallate and the like, and sequestrants, e.g., citric acid.

Thickener compounds include carriers, binders, protective colloids, suspending agents, emulsifiers and the like, e.g., agaragar; carrageenan; cellulose; and cellulose derivatives such as carboxymethyl cellulose and methyl cellulose; natural and synthetic gums such as gum arabic, gum tragacanth; gelatin, proteinaceous materials; lipids, carbohydrates; starches pectins, and emulsifiers, e.g., mono-and diglycerides of fatty acids, skim milk powder, hexoses, pentoses, disaccharides, e.g., sucrose, corn syrup solids and the like.

Surface active agents include emulsifying agents, e.g., fatty acids such as capric acid, caprylic acid, palmitic acid, myristic acid and the like, mono-and diglycerides of fatty acids, lechithin, defoaming and flavor-dispersing agents such as sorbitan monostearate, potassiurn stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, turmeric and curcumin and the like; firming agents such as aluminum sodium sulfate, calcium chloride and calcium gluconate; texturizers; anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources, such as zinc chloride, zinc sulfate and the like.

Other flavorants and flavor intensifiers include organic acid, e.g., fatty saturated acids, unsaturated acids and amino acids; alcohols, e.g., primary and secondary alcohols, esters; carbonyl compounds, e.g., aldehydes and ketones as well as lactones; cyclic organic materials including benzene derivatives isocyclics, heterocyclics such as furans particularly 2,5-dimethyl-3-acetyl furan and 2-methyl-2,3-dihydro furan-3-one, pyridines, pyrazines (particularly monoalkyl, dialkyl, trialkyl and tetra-alkyl substituted pyrazines) and the like, sulfur containing materials including thiazoles, disulfides, thiols, sulfides, aldehydes (for example, 3-phenyl-4-pentenal, 3-phenyl-3-pentenal, 3-phenyl-2-pentenal, 2-phenyl-2-pentenal, and 2-phenyl-3-methyl-2-butenal); trisulfides and the like; other flavor potentiators such as monosodium glutamate, guanylates, inosinates, natural and synthetic flavorants such as vanillin, ethyl vanillin, diacetyl, phenethyl-2-furoate, maltol, natural gums and the like; spices, herbs, essential oils and extractives including "bitterness principles" such as theobromine, caffeine, maringin and other suitable materials creating a bitter effect.

The specific flavoring adjuvant selected for use may be either solid or liquid depending upon the desired physical form of the ultimate product i.e., foodstuff, whether simulated or natural, and should, in any event, be capable of providing an environment in which the combination: 1-n-butoxy-1-ethanol acetate and 2-phenyl-3-carboethoxyfuran and/or bis(cyclohexyl)disulfide can be dispersed or admixed to provide a homogeneous medium. In addition, selection of one or more flavoring adjuvants as well as the quantities thereof will depend upon the precise organoleptic character desired in the finished product. Thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be slected such as various cellulose derivatives.

As will be appreciated by those skilled in the art, the amount of the combination: 1-n-butoxy-1-ethanol acetate and 2-phenyl-3-carboethoxyfuran and/or bis(cyclohexyl)disulfide employed in a particular instance can vary over a relatively wide range whereby to its desired organoleptic effects. All parts and percentages given herein are by weight unless otherwise specified. Thus, correspondingly, greater amounts would be necessary in those instances wherein the ultimate food composition to be flavored is relatively bland to the taste, whereas relatively minor quantities may suffice for purposes of enhancing the composition merely deficient in natural flavor or aroma. Thus, the primary requirement is that the amount selected to be effective, i.e., sufficient to alter the organoleptic characteristics of the parent composition, whether foodstuff per se or flavoring composition. Thus, the use of insufficient quantities of the combination: 1-n-butoxy-1-ethanol acetate and 2-phenyl-3-carboethoxyfuran and/or bis(cyclohexyl)disulfide will, of course, substantially vitiate any possibility of obtaining the desired results while excess quantities prove needlessly costly and in extreme cases, may disrupt the flavoraroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions, it has been found that quantities of the combination: 1-n-butoxy-1-ethanol acetate and 2-phenyl-3-carboethoxyfuran and/or bis(cyclohexyl)disulfide ranging from a small but effective amount, e.g., 0.02 parts per billion up to about 0.1% (1000 parts per million) by weight based on total composition are suitable. Concentrations in excess of the maximum quantity stated are not normally recommended since they fail to provide commensurate enhancement or organoleptic properties. In those cases, wherein the combination: 1-n-butoxy-1-ethanol acetate and 2-phenyl-3-carboethoxyfuran and/or bis(cyclohexyl)disulfide is added to the foodstuff as an integral component of the flavoring composition, it is, of course, essential that the total quantity of flavoring composition employed be sufficient to yield an effective combination: 1-n-butoxy-1-ethanol acetate and 2-phenyl-3-carboethoxyfuran and/or bis(cyclohexyl)disulfide concentration in the foodstuff product.

Further with respect to ultimate food compositions, it has been found that when mixtures of the combination: 1-n-butoxy-1-ethanol acetate and 2-phenyl-3-carboethoxyfuran and/or bis(cyclohexyl)disulfide are used to alter the flavor of foodstuffs, the ratio of the combination: 1-n-butoxy-1-ethanol acetate and 2-phenyl-3-carboethoxyfuran and/or bis(cyclohexyl)disulfide is preferably in the range of from 1.5 (1-n-butoxy-1-ethanol acetate):0.02 (bis[cyclohexyl]disulfide and/or 2-phenyl-3-carboethoxyfuran) up to about 1.5:0.15. As between the bis(cyclohexyl)disulfide and the 2-phenyl-3-carboethoxyfuran, the bis(cyclohexyl)disulfide is the more potent of the two chemical compounds with regard to their respective organoleptic characteristics in food compositions. It is noteworthy that when the compounds in combination: 1-n-butoxy-1-ethanol acetate and 2-phenyl-3-carboethoxyfuran and/or bis(cyclohexyl)disulfide are used together with one another to alter the grape flavor of a foodstuff, a more natural grape flavor is imparted to said foodstuff than when either is used alone.

Food flavoring compositions prepared in accordance with the present invention preferably contain the combination: 1-n-butoxy-1-ethanol acetate and 2-phenyl-3-carboethoxyfuran and/or bis(cyclohexyl)disulfide in concentrations ranging from about 0.0006% up to about 10% by weight based on a total weight of said flavoring composition.

The compositions described herein can be prepared according to conventional techniques well known as typified by cake batters and fruit juices and vegetable juices and can be formulated by merely admixing the involved ingredients within the proportions stated in a suitable blender to obtain the desired consistency, homogeneity of dispersion, etc. Alternatively, flavoring compositions in the form of particulate solids can be conveniently prepared by admixing the combination: 1-n-butoxy-1-ethanol acetate and 2-phenyl-3-carboethoxyfuran and/or bis(cyclohexyl)disulfide with for example gum arabic, gum tragacanth, carrageenan and the like and thereafter spray-drying the resultant mixture whereby to obtain the particular solid product. Pre-prepared flavor mixes in powder form, e.g., a red currant mix or a fruit flavored powder obtained by mixing dried solid components, e.g., starch, sugar and the like and the combination: 1-n-butoxy-1-ethanol acetate and 2-phenyl-3-carboethoxyfuran and/or bis(cyclohexyl)disulfide in a dry blender until the requisite degree of uniformity is achieved.

It is presently preferred to combine the combination: 1-n-butoxy-1-ethanol acetae and 2-phenyl-3-carboethoxyfuran and/or bis(cyclohexyl)disulfide with the following adjuvants:

Methyl anthranilate;
Ethyl acetate;
Ethyl anthranilate;
Beta-Damascenone
Trans, trans-Delta-Damascone
Ethyl butyrate;
Ethyl methyl phenyl glycidate;
Cinnamic alcohol;
Amyl valerianate;
Cinnamyl propionate;
Rhodinyl acetate;
Methyl beta-hydroxy butyrate; and
Ethyl beta-hydroxy butyrate.

The following examples serve to illustrate my invention, and this invention is to be considered restricted thereto only as indicated in the appended claims.

All parts and percentages given herein are by weight unless otherwise specified.

EXAMPLE I

Preparation of 1-n-Butoxy-1-Ethanol Acetate

Reaction:

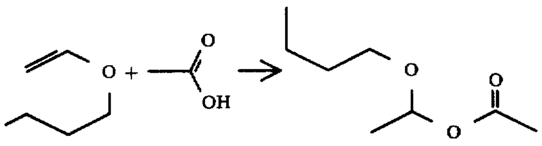

Into a 2000 ml reaction flask, equipped with stirrer, cooling bath, thermometer, addition funnel and nitrogen blanket apparatus, is added 420 ml of acetic acid (7.0 moles) and 3.0 ml of acetyl chloride. Dropwise over a period of 1.5 hours, while maintaining the reaction mass at 50°-72° C. is added 950 ml (7.7 moles) of n-butyl vinyl ether (770 grams). At the end of the addition of said n-butyl vinyl ether, the reaction mass is stirred for a period of six hours, while maintaining the temperature thereof at 30° C.

The reaction mass is then distilled through a 2" splash column yielding the following fractions:

| Fraction Number | Vapor Temp. °C. | Liquid Temp. °C. | Head Vac. mm. Hg. | Reflux Ratio R/D |
|---|---|---|---|---|
| 1 | 40/37 | 43/41 | 3/5 | RO |
| 2 | 37 | 42 | 3 | RO |
| 3 | 37 | 42 | 3 | RO |
| 4 | 45 | 50 | 5 | RO |
| 5 | 45 | 69 | 3 | RO |

EXAMPLE IIA 500 mg. of beta-cyclic dextrin is dissolved in 40 ml of water to which there is added a drop of 0.1 M sodium hydroxide solution to avoid having water with an acid pH a mixture of 50 parts by weight of 1-n-butoxy-1-ethanol acetate prepared according to Example I, 25 parts by weight 2-phenyl-3-carboethoxyfuran and 25 parts by weight of bis(cyclohexyl)disulfide is then added to the solution. The container for the solution is immediately stoppered and shaken vigorously to obtain a homogeneous solution. Then another solution is prepared by dissolving 1.0 g of alpha-cyclic dextrin in 40 ml of water to which has been added, one drop of 0.1 M sodium hydroxide solution. A mixture of 50 parts by weight of 1-n-butoxy-1-ethanol acetate prepared according to Example I, 25 parts by weight 2-phenyl-3-carboethoxyfuran and 25 parts by weight of bis(cyclohexyl)disulfide is then added to the resulting solution and the container is stoppered and shaken vigorously to obtain a homogeneous solution. Both solutions are then frozen and lyophilized overnight, to produce, respectively, beta-cyclic dextrin (1-n-butoxy-1-ethanol acetate, 2-phenyl-3-carboethoxyfuran, and bis(cyclohexyl)disulfide mixture) and alpha-cyclic dextrin (1-n-butoxy-1-ethanol acetate, 2-phenyl-3-carboethoxyfuran, and bis(cyclohexyl)disulfide mixture) complexes in dry form. These are analyzed colorimetrically using 10 mg of each complex per 100 ml of water, and each complex is found to have bound 12% by weight of (1-n-butoxy-1-ethanol acetate, 2-phenyl-3-carboethoxyfuran and bis(-cyclohexyl)disulfide mixture). A second analysis using 30 mg of complex per 100 ml of water shows the beta-cyclic dextrin complex to have 10.8% by weight of (1-n-butoxy-1-ethanol acetate, 2-phenyl-3-carboethoxyfuran and bis(cyclohexyl)disulfide mixture) and the alpha-cyclic dextrin complex to have 11.4% of (1-n-butoxy-1-ethanol acetate, 2-phenyl-3-carboethoxyfuran and bis(cyclohexyl)disulfide mixture). The colorimetric analysis is run in the following way: To 1 ml of aqueous sample solution containing 0.1 mg (or 0.01% by weight) of dissolved complex, there is added 1.0 ml of a saturated alcoholic solution of 2,4-dinitrophenylhydrazine and one drop of concentrated hydrochloric acid, the resulting solution is mixed, and then heated for 30 minutes at 50° C. After heating 10.0 ml of 10% potassium hydroxide in 70% alcohol is added, and the color is read at 480 millimicrons on a spectrophotometer. The concentration is read off a previously prepared color concentration curve. The foregoing assay is based on the method described by Snell, et al. in "Colorimetric Method of Analyses", vol. 3, page 253, D. Van Nostrand Co., Inc. New York 1953.

EXAMPLE IIB

Dry Grape Flavored Beverage

About 2.5 mg of the beta-cyclic dextrin complex of Example IIA is added to 6.7 gm of a dry grape-flavored beverage mix comprising sucrose, citric acid and a cloud-forming agent. When the mix is dissolved in about 50 ml of water, the beverage has the characteristic odor and flavor of fresh grapes, and is judged to be superior in these respects over a beverage prepared in exactly the same way but in which the complex is omitted.

EXAMPLE III

Grape Flavor Formulation

The following mixture is prepared:

TABLE I

| Ingredients | Parts by Weight |
|---|---|
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | 0.3 |
| Cognac Oil | 0.1 |
| Ethyl alcohol | 73.6 |

The above mixture is judged to be an acceptable grape flavor when evaluated in a sweetened in acidified aqueous tasting solution. 1.5 Parts of 50:50 wt/wt mixture of 2-phenyl-3-carboethoxyfuran and 1-n-butoxy-1-ethanol acetate is added to the above flavor and a significant improvement in aroma and taste is noted. When this is evaluated in the aforementioned tasting solution, it is judged to have an improved grape character and grape fidelity. It contains more fresh concord grape character, true fruitness with a nuance of wine. In addition, it is judged to be a more rounded and natural flavor, superior to the product made without the addition of a 50:50 wt/wt mixture of 2-phenyl-3-carboethoxyfuran and 1-n-butoxy-1-ethanol acetate is added to the above flavor in both aroma and taste.

EXAMPLE IV

Grape Flavor Formulation

A mixture is prepared duplicating that set forth in Table I of Example III.

The above mixture is judged to be an acceptable grape flavor when evaluated in a sweetened and acidified aqueous tasting solution. 0.02 parts of a 50:50 mixture of bis(cyclohexyl)disulfide and 1-n-butoxy-1-ethanol acetate is added to the above flavor and a significant improvement in aroma and taste is noted. It is judged to be a better blended flavor, more natural and reminiscent of natural grape. It imparts a certain mustiness and eliminates the typical methyl anthranilate character. It is a more rounded and natural flavor.

EXAMPLE V

Grape Flavor Formulation

A mixture is prepared duplicating that set forth in Table I of Example III.

The above mixture is judged to be an acceptable grape flavor when evaluated in a sweetened and acidified aqueous tasting solution. 0.04 Parts of a 50:50 mixture of bis(cyclohexyl)disulfide and 1-n-butoxy-1-ethanol acetate is added to the above flavor and a significant improvement in aroma and taste is noted. It is judged to be a better blended flavor, more natural and reminiscent of natural grape. It imparts a certain mustiness and eliminates the typical methyl anthranilate character. It is a more rounded and natural flavor.

EXAMPLE VI

Grape Flavor Formulation

A mixture is prepared duplicating that set forth in Table I of Example III.

The above mixture is judged to be an acceptable grape flavor when evaluated in a sweetened and acidified aqueous tasting solution. 0.07 Parts of 50:50 mixture of bis(cyclohexyl)disulfide and 1-n-butoxy-1-ethanol acetate is added to the above flavor and a significant improvement in aroma and taste is noted. It is judged to be a better blended flavor, more natural and reminiscent of natural grape. It imparts a certain mustiness and eliminates the typical methyl anthranilate character. It is a more rounded and natural flavor.

EXAMPLE VII

Grape Flavor Formulation

A mixture is prepared duplicating that set forth in Table I of Example III.

The above mixture is judged to be an acceptable grape flavor when evaluated in a sweetened and acidified aqueous tasting solution. 0.12 Parts of 50:50 mixture of bis(cyclohexyl)disulfide and 1-n-butoxy-1-ethanol acetate is added to the above flavor and a significant improvement in aroma and taste is noted. It is judged to a better blended flavor, more natural and reminiscent of natural grape. It imparts a certain mustiness and eliminates the typical anthranilate character. It is a more rounded and natural flavor.

EXAMPLE VIII

Grape Flavor Formulation

A mixture is prepared duplicating that set forth in Table I of Example III.

The above mixture is judged to be an acceptable grape flavor when evaluated in a sweetened and acidified aqueous tasting solution. 0.15 Parts of 50:50 mixture of bis(cyclohexyl)disulfide and 1-n-butoxy-1-ethanol acetate is added to the above flavor and a significant improvement in aroma and taste is noted. It is judged to be a better blended flavor, more natural and reminiscent of natural grape. It imparts a certain mustiness and eliminates the typical methyl anthranilate character. It is a more rounded and natural flavor.

EXAMPLE IX

Grape Flavor Formulation

A mixture is prepared duplicating that set forth in Table I of Example III.

The above mixture is judged to be an acceptable grape flavor when evaluated in a sweetened and acidified aqueous tasting solution. 0.20 Parts of 50:50 mixture of bis(cyclohexyl)disulfide and 1-n-butoxy-1-ethanol acetate is added to the above flavor and a significant improvement in aroma and taste is noted. It is judged to a better blended flavor, more natural and reminiscent of natural grape. It imparts a certain mustiness and eliminates the typical methyl anthranilate character. It is a more rounded and natural flavor.

EXAMPLE X

Grape Flavor Formulation

A mixture is prepared duplicating that set forth in Table I of Example III.

The above mixture is judged to be an acceptable grape flavor when evaluated in a sweetened and acidified aqueous tasting solution. 1.7 Parts of 1-n-butoxy-1-ethanol acetate, 1.5 parts 2-phenyl-3-carboethoxyfuran and 0.02 parts of bis(cyclohexyl)disulfide is added to the above flavor and a significant improvement in aroma and taste is noted. This improvement is additive, not synergistic. It is judged to be a better blended, more natural flavor and reminiscent of natural concord grape. It is a more rounded and has more grape fidelity. It imparts a nuance of wine with a certain mustiness.

EXAMPLE XI

Grape Flavor Formulation

A mixture is prepared duplicating that set forth in Table I of Example III.

The above mixture is judged to be an acceptable grape flavor when evaluated in a sweetened and acidified aqueous tasting solution. 1.7 Parts of 1-n-butoxy-1-ethanol acetate, 1.5 parts of 2-phenyl-3-carboethoxyfuran and 0.04 parts of bis(cyclohexyl)disulfide is added to the above flavor and a significant improvement in aroma and taste is noted. It is judged to be a better blended, more natural flavor and reminiscent of natural concord grape. It is a more rounded and has more grape fidelity. It imparts a nuance of wine with a certain mustiness.

EXAMPLE XII

Grape Flavor Formulation

A mixture is prepared duplicating that set forth in Table I of Example III.

The above mixture is judged to be an acceptable grape flavor when evaluated in a sweetened and acidified aqueous tasting solution. 1.7 Parts of 1-n-butoxy-1-ethanol acetate, 1.5 parts of 2-phenyl-3-carboethoxyfuran and 0.02 parts of bis(cyclohexyl)disulfide is added to the above flavor and a significant improvement in aroma and taste is noted. It is judged to be a better blended, more natural flavor and reminiscent of natural concord grape. It is a more rounded and has more grape fidelity. It imparts a nuance of wine with a certain mustiness.

EXAMPLE XIII

Grape Flavor Formulation

A mixture is prepared duplicating that set forth in Table I of Example III.

The above mixture is judged to be an acceptable grape flavor when evaluated in a sweetened and acidified aqueous tasting solution. 1.7 Parts of 1-n-butoxy-1-ethanol acetate, 1.5 parts of 2-phenyl-3-carboethoxyfuran and 0.09 parts of bis(cyclohexyl)disulfide is added to the above flavor and a significant improvement in aroma and taste is noted. It is judged to be a better blended, more natural flavor and reminiscent of natural concord grape. It is a more rounded and has more grape fidelity. It imparts a nuance of wine with a certain mustiness.

EXAMPLE XIV

Grape Flavor Formulation

A mixture is prepared duplicating that set forth in Table I of Example III.

The above mixture is judged to be an acceptable grape flavor when evaluated in a sweetened and acidified aqueous tasting solution. 1.7 Parts of 1-n-butoxy-1-ethanol acetate, 1.5 parts of 2-phenyl-3-carboethoxyfuran and 0.12 parts of bis(cyclohexyl)disulfide is added to the above flavor and a significant improvement in aroma and taste is noted. It is judged to be a better blended, more natural flavor and reminiscent of natural concord grape. It is a more rounded and has more grape fidelity. It imparts a nuance of wine with a certain mustiness.

EXAMPLE XV

Grape Flavor Formulation

A mixture is prepared duplicating that set forth in Table I of Example III.

The above mixture is judged to be an acceptable grape flavor when evaluated in a sweetened and acidified aqueous tasting solution. 1.7 Parts of 1-n-butoxy-1-ethanol acetate, 1.5 parts of 2-phenyl-3-carboethoxyfuran and 0.15 parts of bis(cyclohexyl)disulfide is added to the above flavor and a significant improvement in aroma and taste is noted. It is judged to be a better blended, more natural flavor and reminiscent of natural concord grape. It is a more rounded and has more grape fidelity. It imparts a nuance of wine with a certain mustiness.

EXAMPLE XVI

The following materials are separately added to the grape flavor formulation set forth supra:

a. Cyclohexyl mercaptan having the structure:

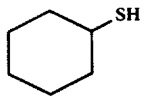

(U.S. Pat. No. 3,677,772; Mussinan)

b. Furfuryl valerate having the structure:

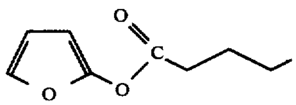

(U.S. Pat. No. 3,702,253; Winter et al)

c. 1 Part Bis(cyclohexyl)disulfide having the structure:

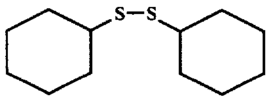

and 1 Part 1-n-butoxy-1-ethanol acetate having the structure:

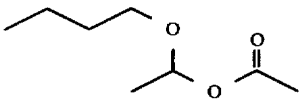

| GRAPE FLAVOR FORMULATION: Ingredients: | Parts by Weight |
|---|---|
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c)) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 100 ppm in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a): At the levels added material (a) is detrimental to the grape flavor and gives it a meaty quality.

b. Reconstituted grape juice containing material (b): At the levels added material (b) is detrimental to the grape flavor and gives it a meaty quality.

c. Reconstituted grape juice with formulation containing (c) added:

The natural grape juice and the reconstituted grape juice containing the formulation with (c) added are substantially familiar and substantially more flavorful than the reconstituted grape juice to which the essence alone is added.

Conclusions:

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XVII

The following materials are separately added to the grape flavor formulation set forth supra:

a. Cyclohexyl mercaptan having the structure:

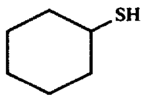

(U.S. Pat. No. 3,677,772; Mussinan)

b. Furfuryl valerate having the structure:

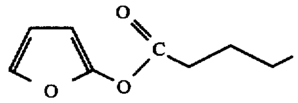

(U.S. Pat. No. 3,702,252; Winter et al)

c. 1 Part Bis(cyclohexyl)disulfide having the structure:

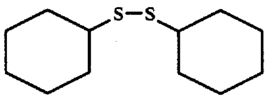

and 1 Part 1-n-butoxy-1-ethanol acetate having the structure:

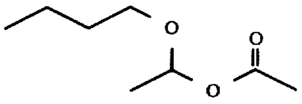

| GRAPE FLAVOR FORMULATION: Ingredients | Parts by Weight |
|---|---|
| Methyl anthranilate | 11.0 |
| Ethyl acetate | 9.0 |
| Ethyl anthranilate | 2.5 |
| Ethyl butyrate | 2.0 |
| Ethyl Methyl Phenyl Glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c)) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 500 ppm in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a):

At the levels added material (a) is detrimental to the grape flavor and gives it a meaty quality.

b. Reconstituted grape juice containing material (b):

At the levels added material (b) is detrimental to the grape flavor and gives it a meaty quality.

c. Reconstituted grape juice with formulation containing (c) added:

The natural grape juice and the reconstituted grape juice containing the formulation with (c) added are substantially familiar and substantially more flavorful than the reconstituted grape juice to which the essence alone is added.

Conclusions:

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XVIII

The following materials are separately added to the grape flavor formulation set forth supra:

a. Cyclohexyl mercaptan having the structure:

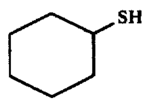

(U.S. Pat. No. 3,677,772; Mussinan)

b. Furfuryl valerate having the structure:

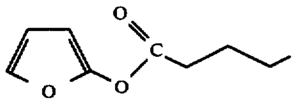

(U.S. Pat. No. 3,702,253; Winter et al)

c. 1 Part Bis(cyclohexyl)disulfide having the structure:

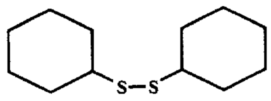

and 1 Part 1-n-butoxy-1-ethanol acetate having the structure:

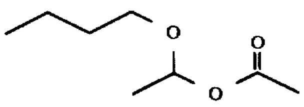

| GRAPE FLAVOR FORMULATION: Ingredients | Parts by Weight |
|---|---|
| Methyl anthranilate | 11.0 |

-continued

| GRAPE FLAVOR FORMULATION: Ingredients | Parts by Weight |
|---|---|
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c)) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 0.5% in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a):

At the levels added material (a) is detrimental to the grape flavor and gives it a meaty quality.

b. Reconstituted grape juice containing material (b):

At the levels added material (b) is detrimental to the grape flavor and gives it a meaty quality.

c. Reconstituted grape juice with formulation containing (c) added:

The natural grape juice and the reconstituted grape juice containing the formulation (c) added are juice containing the formulation with (c) added are substantially familiar and substantially more flavorful than the reconstituted grape juice to which the essence alone is added.

Conclusions:

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XIX

The following materials are separately added to the grape flavor formulation set forth supra:

a. Cyclohexyl mercaptan having the structure:

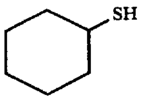

(U.S. Pat. No. 3,677,772; Mussinan)

b. Furfuryl valerate having the structure:

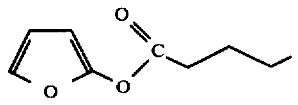

(U.S. Pat. No. 3,702,253; Winter et al)

c. A mixture of 1-n-butoxy-1-ethanol acetate, 2-phenyl-3-carboethoxyfuran having the structure:

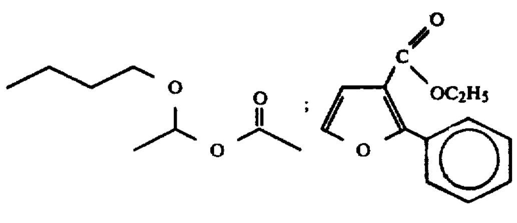

and Bis (cyclohexl) disulfide having the structure:

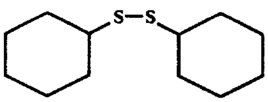

wherein, the 1-n-butoxy-1-ethanol acetate, 2-phenyl-3-carboethoxyfuran and bis (cyclohexyl)disulfide is in a ratio of 1.7 parts by weight of 1-n-butoxy-1-ethanol acetate, 1.5 parts by weight of 2-phenyl-3-carboethoxyfuran and 0.02 parts by weight of bis (cyclohexyl) disulfide.

| GRAPE FLAVOR FORMULATION: Ingredients | Parts by Weight |
|---|---|
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c)) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 1% in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a): At the levels added material (a) is detrimental to the grape flavor and gives it a meaty quality.

b. Reconstituted grape juice containing material (b): At the levels added material (b) is detrimental to the grape flavor and gives it a meaty quality.

c. Reconstituted grape juice with formulation containing (c) added:

The natural grape juice and the reconstituted grape juice containing the formulation (c) added are juice containing the formulation with (c) added are substantially familiar and substantially more flavorful than the reconstituted grape juice to which the essence alone is added.

Conclusions:

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XX

The following materials are separately added to the grape flavor formulation set forth supra:

a. Cyclohexyl mercaptan having the structure:

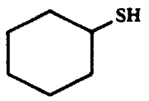

(U.S. Pat. No. 3,677,772; Mussinan)

b. Furfuryl valerate having the structure:

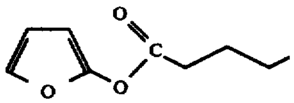

(U.S. Pat. No. 3,702,253; Winter et al.)

c. A mixture of 1-n-butoxy-1-ethanol acetate, 2-phenyl-3-carbohexylfuran having the structure:

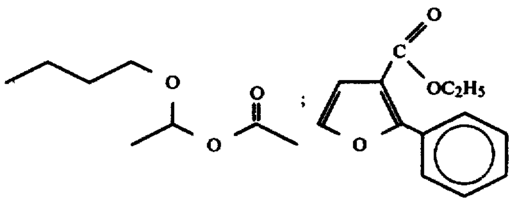

and Bis (cyclohexyl) disulfide having the structure:

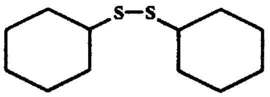

wherein, the 1-n-butoxy-1-ethanol acetate, 2-phenyl-3-carboethoxyfuran and bis (cyclohexyl) disulfide is in a ratio of 1.7 parts by weight of 1-n-butoxy-1-ethanol acetate, 1.5 parts by weight of 2-phenyl-3-carboethoxyfuran and 0.02 parts by weight of bis (cyclohexyl) disulfide.

| GRAPE FLAVOR FORMULATION: Ingredients | Parts by Weight |
|---|---|
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the | 1.52 |

-continued

| GRAPE FLAVOR FORMULATION: Ingredients | Parts by Weight |
|---|---|
| alternative one of (a), (b) or (c)) | |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 50 ppm in reconstituted grape juice prepared from the concentrate. The reconstituted grape juice produced using the test compounds in the above flavor formulation are then compared with one another and with reconstituted grape juice to which natural grape essence alone has been added and to natural grape juice.

The results of the investigation and the conclusions reached as the result of same follow:

a. Reconstituted grape juice containing material (a): At the levels added material (a) is detrimental to the grape flavor and gives it a meaty quality.

b. Reconstituted grape juice containing material (b): At the levels added material (b) is detrimental to the grape flavor and gives it a meaty quality.

c. Reconstituted grape juice with formulation containing (c) added: The natural grape juice and the reconstituted grape juice containing the formulation (c) added are juice containing the formulation with (c) added are substantially familiar and substantially more flavorful than the reconstituted grape juice to which the essence alone is added.

Conclusions:

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XXI

The following materials are separately added to the grape flavor formulation set forth supra:

a. Cyclohexyl mercaptan having the structure:

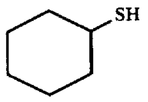

(U.S. Pat. No. 3,677,722; Mussinan)

b. Furfuryl valerate having the structure:

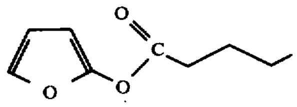

(U.S. Pat. No. 3,702,253; Winter et al.)

c. A mixture of 1-n-butoxy-1-ethanol acetate, 2-phenyl-3-carboethoxyfuran having the structure:

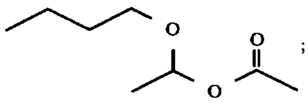

;

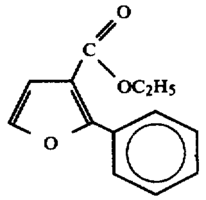

and Bis (cyclohexyl) disulfide having the structure:

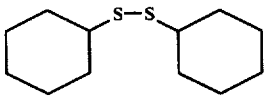

wherein, the 1-n-butoxy-1-ethanol acetate, 2-phenyl-3-carboethoxyfuran and bis (cyclohexyl) disulfide is in a ratio of 1.7 parts by weight of 1-n-butoxy-1-ethanol acetate, 1.5 parts by weight of 2-phenyl-3-carboethoxyfuran and 0.02 parts by weight of bis (cyclohexyl) disulfide.

| GRAPE FLAVOR FORMULATION: Ingredients | Parts by Weight |
|---|---|
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c)) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 300 ppm in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a): At the levels added material (a) is detrimental to the grape flavor and gives it a meaty quality.

b. Reconstituted grape juice containing material (b): At the levels added material (b) is detrimental to the grape flavor and gives it a meaty quality.

c. Reconstituted grape juice with formulation containing (c) added: The natural grape juice and the reconstituted grape juice containing the formulation (c) added are juice containing the formulation with (c) added are substantially familiar and substantially more flavorful than the reconstituted grape juice to which the essence alone is added.

Conclusions:

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XXII

The following materials are separately added to the grape flavor formulation set forth supra:

a. Cyclohexyl mercaptan having the structure:

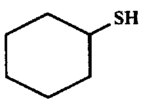

(U.S. Pat. No. 3,677,772; Mussinan)

b. Furfuryl valerate having the structure:

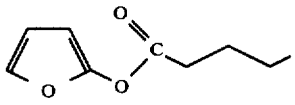

(U.S. Pat. No. 3,702,253; Winter et al.)

c. A mixture of 1-n-butoxy-1-ethanol acetate, 2-phenyl-3-carboethoxyfuran having the structure:

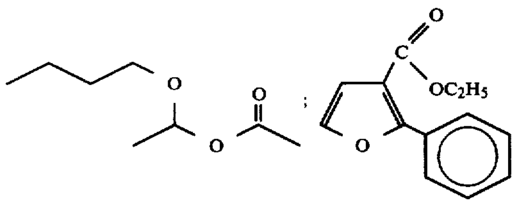

and Bis(cyclohexyl)disulfide having the structure:

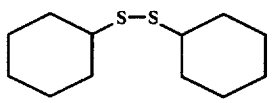

wherein, the 1-n-butoxy-1-ethanol acetate, 2-phenyl-3-carboethoxyfuran and bis(cyclohexyl)disulfide is in a ratio of 1.7 parts by weight of 1-n-butoxy-1-ethanol acetate, 1.5 parts by weight of 2-phenyl-3-carboethoxyfuran and 0.02 parts by weight of bis(cyclohexyl)disulfide.

GRAPE FLAVOR FORMULATION:

| Ingredients | Parts by Weight |
|---|---|
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c)) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 0.5% in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a):
At the levels added material (a) is detrimental to the grape flavor and gives it a meaty quality.

b. Reconstituted grape juice containing material (b):
At the levels added material (b) is detrimental to the grape flavor and gives it a meaty quality.

c. Reconstituted grape juice with formulation containing (c) added:
The natural grape juice and the reconstituted grape juice containing the formulation (c) added are juice containing the formulation with (c) added are substantially familiar and substantially more flavorful than the reconstituted grape juice to which the essence alone is added.

Conclusions:

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XXIII

The following materials are separately added to the grape flavor formulation set forth supra:

a. Cyclohexyl mercaptan having the structure:

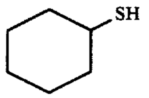

(U.S. Pat. No. 3,677,772; Mussinan)

b. Furfuryl valerate having the structure:

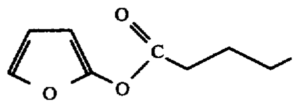

(U.S. Pat. No. 3,702,253; Winter el al.)

c. A mixture of 1-n-butoxy-1-ethanol acetate, 2-phenyl-3-carboethoxyfuran having the structure:

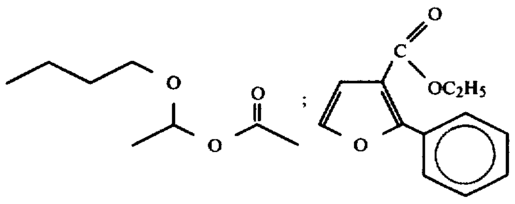

and Bis(cyclohexyl)disulfide having the structure:

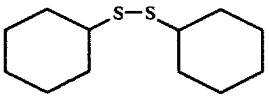

wherein, the 1-n-butoxy-1-ethanol acetate, 2-phenyl-3-carboethoxyfuran and bis(cyclohexyl)disulfide is in a ratio of 1.7 parts by weight of 1-n-butoxy-1-ethanol acetate, 1.5 parts by weight of 2-phenyl-3-carboethoxyfuran and 0.02 parts by weight of bis(cyclohexyl)disulfide.

| GRAPE FLAVOR FORMULATION: | |
|---|---|
| Ingredients | Parts by Weight |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c)) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 0.5% in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a):

At the levels added material (a) is detrimental to the grape flavor and gives it a meaty quality.

b. Reconstituted grape juice containing material (b):

At the levels added material (b) is detrimental to the grape flavor and gives it a meaty quality.

c. Reconstituted grape juice with formulation containing (c) added:

The natural grape juice and the reconstituted grape juice containing the formulation (c) added are juice containing the formulation with (c) added are substantially familiar and substantially more flavorful than the reconstituted grape juice to which the essence alone is added.

Conclusions:

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XXIV

The following materials are separately added to the grape flavor formulation set forth supra:

a. Cyclohexyl mercaptan having the structure:

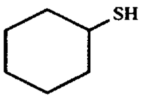

(U.S. Pat. No. 3,677,772; Mussinan)

b. Furfuryl valerate having the structure:

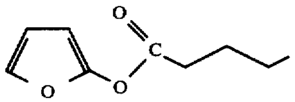

(U.S. Pat. No. 3,702,253; Winter et al.)

c. A mixture of 1-n-butoxy-1-ethanol acetate, 2-phenyl-3-carboethoxyfuran having the structure:

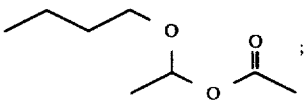 ; 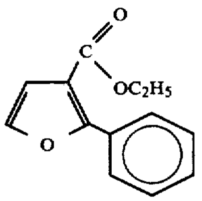

and Bis(cyclohexyl)disulfide having the structure:

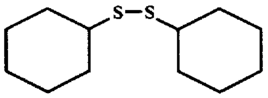

wherein, the 1-n-butoxy-1-ethanol acetate, 2-phenyl-3-carboethoxyfuran and bis(cyclohexyl)disulfide is in a ratio of 1.7 parts by weight of 1-n-butoxy-1-ethanol acetate, 1.5 parts by weight of 2-phenyl-3-carboethoxyfuran and 0.02 parts by weight of bis(cyclohexyl)disulfide.

| GRAPE FLAVOR FORMULATION: | |
|---|---|
| Ingredients | Parts by Weight |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c)) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 50 ppm in reconstituted grape juice prepared from the concentrate. The reconstituted grape juice produced using the test compounds in the above flavor formulation are then compared with one another and with reconstituted grape juice to which natural grape essence along has been added and to natural grape juice. The results of the investigation and the conclusions reached as the result of same follow:

a. Reconstituted grape juice containing material (a): At the levels added material (a) is detrimental to the grape flavor and gives it a meaty quality.

b. Reconstituted grape juice containing material (b): At the levels added material (b) is detrimental to the grape flavor and gives it a meaty quality.

c. Reconstituted grape juice with formulation containing (c) added:

The natural grape juice and the reconstituted grape juice containing the formulation (c) added are juice containing the formulation with (c) added are substantially familiar and substantially more flavorful than the reconstituted grape juice to which the essence alone is added.

Conclusions:

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XXV

The following materials are separately added to the grape flavor formulation set forth supra:

a. Cyclohexyl mercaptan having the structure:

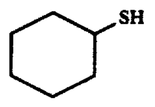

(U.S. Pat. No. 3,677,772; Mussinan)

b. Furfuryl valerate having the structure:

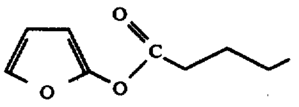

(U.S. Pat. No. 3,702,253; Winter el al.)

c. A mixture of 1-n-butoxy-1-ethanol acetate, 2-phenyl-3-carboethoxyfuran having the structure:

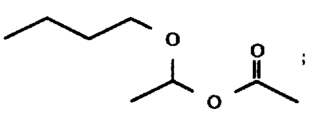 ; 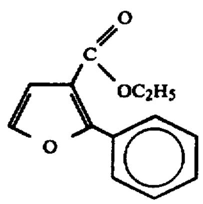

and Bis(cyclohexyl)disulfide having the structure:

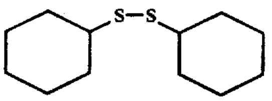

wherein, the 1-n-butoxy-1-ethanol acetate, 2-phenyl-3-carboethoxyfuran and bis(cyclohexyl)disulfide is in a ratio of 1.7 parts by weight of 1-n-butoxy-1-ethanol acetate, 1.5 parts by weight of 2-phenyl-3-carboethoxyfuran and 0.02 parts by weight of bis(cyclohexyl)disulfide.

GRAPE FLAVOR FORMULATION:

| Ingredients | Parts by Weight |
|---|---|
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c)) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 250 ppm in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a): At the levels added material (a) is detrimental to the grape flavor and gives it a meaty quality.

b. Reconstituted grape juice containing material (b): At the levels added material (b) is detrimental to the grape flavor and gives it a meaty quality.

c. Reconstituted grape juice with formulation containing (c) added:

The natural grape juice and the reconstituted grape juice containing the formulation (c) added are juice containing the formulation with (c) added are substantially familiar and substantially more flavorful than the reconstituted grape juice to which the essence alone is added.

Conclusions:

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XXVI

The following materials are separately added to the grape flavor formulation set forth supra:

a. Cyclohexyl mercaptan having the structure:

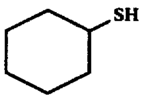

(U.S. Pat. No. 3,677,772; Mussinan)

b. Furfuryl valerate having the structure:

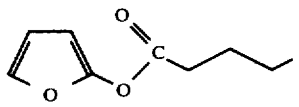

(U.S. Pat. No. 3,702,253; Winter et al.)

c. A mixture of 1-n-butoxy-1-ethanol acetate, 2-phenyl-3-carboethoxyfuran having the structure:

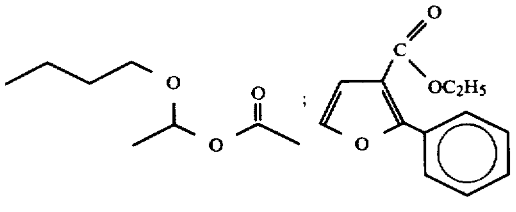

and Bis(cyclohexyl)disulfide having the structure:

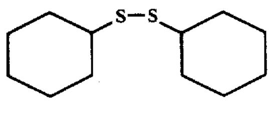

wherein, the 1-n-butoxy-1-ethanol acetate, 2-phenyl-3-carboethoxyfuran and bis(cyclohexyl)disulfide is in a ratio of 1.7 parts by weight of 1-n-butoxy-1-ethanol acetate, 1.5 parts by weight of 2-phenyl-3-carboethoxyfuran and 0.02 parts by weight of bis(cyclohexyl)disulfide.

| GRAPE FLAVOR FORMULATION: | |
|---|---|
| Ingredients | Parts by Weight |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c)) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 1% in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a): At the levels added material (a) is detrimental to the grape flavor and gives it a meaty quality.

b. Reconstituted grape juice containing material (b): At the levels added material (b) is detrimental to the grape flavor and gives it a meaty quality.

c. Reconstituted grape juice with formulation containing (c) added: The natural grape juice and the reconstituted grape juice containing the formulation (c) added are juice containing the formulation with (c) added are substantially familiar and substantially more flavorful than the reconstituted grape juice to which the essence alone is added.

Conclusions:

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XXVII

The following materials are separately added to the grape flavor formulation set forth supra:

a. Cyclohexyl mercaptan having the structure:

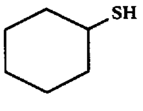

(U.S. Pat. No. 3,677,772; Mussinan)

b. Furfuryl valerate having the structure:

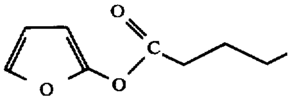

(U.S. Pat. No. 3,702,253; Winter et al.)

c. A mixture of 1-n-butoxy-1-ethanol acetate, 2-phenyl-3-carboethoxyfuran having the structure:

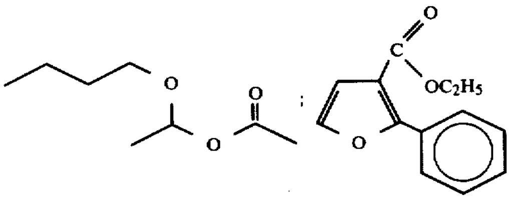

and Bis(cyclohexyl)disulfide having the structure:

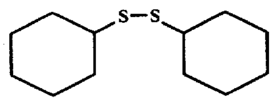

wherein, the 1-n-butoxy-1-ethanol acetate, 2-phenyl-3-carboethoxyfuran and bis(cyclohexyl)disulfide is in a ratio of 1.7 parts by weight of 1-n-butoxy-1-ethanol acetate, 1.5 parts by weight of 2-phenyl-3-carboethoxyfuran and 0.02 parts by weight of bis(cyclohexyl)disulfide.

| GRAPE FLAVOR FORMULATION: | |
|---|---|
| Ingredients | Parts by Weight |
| Methyl anthranilate | 11.0 |
| Ethyl acetate | 9.0 |
| Ethyl anthranilate | 2.5 |
| Ethyl butyrate | 2.0 |

-continued

| GRAPE FLAVOR FORMULATION: Ingredients | Parts by Weight |
|---|---|
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c)) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 0.4% in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a): At the levels added material (a) is detrimental to the grape flavor and gives it a meaty quality.

b. Reconstituted grape juice containing material (b): At the levels added material (b) is detrimental to the grape flavor and gives it a meaty quality.

c. Reconstituted grape juice with formulation containing (c) added:

The natural grape juice and the reconstituted grape juice containing the formulation (c) added are juice containing the formulation with (c) added are substantially familiar and substantially more flavorful than the reconstituted grape juice to which the essence alone is added.

Conclusions:

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XXVIII

The following flavor materials are separately added to the grape juice prepared as set forth below:

I. FLAVOR MATERIAL a. Cyclohexyl mercaptan having the structure:

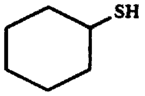

(U.S. Pat. No. 3,677,772; Mussinan)

b. Furfuryl valerate having the structure:

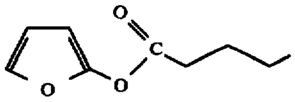

(U.S. Pat. No. 3,702,253; Winter et al.)

c. A mixture of 1-n-butoxy-1-ethanol acetate, 2-phenyl-3-carboethoxyfuran having the structure:

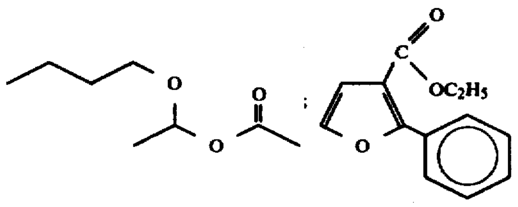

and Bis(cyclohexyl)disulfide having the structure:

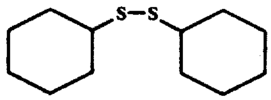

wherein, the 1-n-butoxy-1-ethanol acetate, 2-phenyl-3-carboethoxyfuran and bis(cyclohexyl)disulfide is in a ratio of 1.7 parts by weight of 1-n-butoxy-1-ethanol acetate, 1.5 parts by weight of 2-phenyl-3-carboethoxyfuran and 0.02 parts by weight of bis(cyclohexyl)disulfide.

d. 2-Phenyl-3-carboethoxyfuran having the structure:

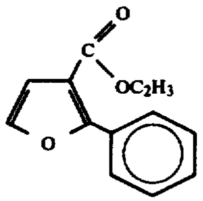

e. Bis(cyclohexyl)disulfide having the structure:

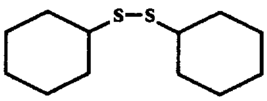

f. A mixture of 2-phenyl-3-carboethoxyfuran having the structure:

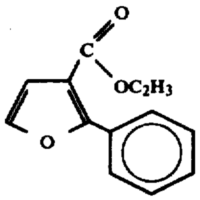

and bis(cyclohexyl)disulfide having the structure:

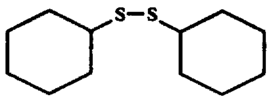

wherein the 2-phenyl-3-carboethoxyfuran and bis(cyclohexyl)disulfide is in a ratio of 1.5 parts by weight of 2-phenyl-3-carboethoxyfuran and 0.15 parts by weight of bis(cyclohexyl)disulfide.

II. GRAPE JUICE

A grape juice concentrate is prepared from natural grape juice by a vacuum evaporation process. A concentration of 46° Brix is obtained which is combined with 100-fold natural grape essence in the ratio of 100:1. To this is added sufficient flavor material as set forth above to provide a level of 0.5% reconstituted grape juice prepared from the concentrate. The reconstituted grape juice produced using the above test flavor materials are then compared with one another and with reconstituted grape juice to which natural grape essence alone has been added and to natural grape juice. The results of the investigation and the conclusions reached as the result of same follow:

a. Reconstituted grape juice containing material (a):
At the levels added material (a) is detrimental to the grape flavor and gives it a meaty quality.

b. Reconstituted grape juice containing material (b):
At the levels added material (b) is detrimental to the grape flavor and gives it a meaty quality.

c. Reconstituted grape juice containing (c), (d), (e) or (f) added:
The natural grape juice and the reconstituted grape juice containing (c), (d), (e), or (f) added are substantially similar and substantially more flavorful than the reconstituted grape juice to which the essence alone is added.

Conclusions:
Comparing (a), (b), (c), (d), (e) and (f), the materials which give rise to advantageous results when added to reconstituted grape juice or grape juice per se are materials (c), (d), (e) and (f). Materials (c), (d), (e) and (f) have unexpected, unobvious and advantageous qualities insofar as grape flavor is concerned when compared with the organoleptic properties of materials (a) and (b).

EXAMPLE XXVIII

A. Powder flavor formulation

20 Grams of the flavor formulation of Example III is emulsified in a solution containing 300 g gum acacia and 700 g water. The emulsion is spray-dried with a Bowen Lab Model Drier utilizing 260 c.f.m. of air with an inlet temperature of 500° F., an outlet temperature of 200° F. and a wheel speed of 50,000 rpm.

B. SUSTAINED RELEASE FLAVOR

The following mixture is prepared:

| Ingredients | Parts by Weight |
|---|---|
| Liquid Grape Flavor of Example III | 20 |
| Propylene Glycol | 9 |
| Cab-O-Sil ® M-5 Brand of Silica produced by the Cabot corporation of 125 High Street, Boston, Mass. 02110; Physical Properties: Surface Area: 200 $m^2$/gm Nominal particle size: 0.012 microns Density: 2.3 lbs/cu. ft. | 5.00 |

The Cab-O-Sil is dispersed in the liquid grape flavor composition of Example III with vigorous stirring, thereby resulting in a viscous liquid. 71 parts by weight of the powder flavor composition of Part 1, supra, is then blended into the said viscous liquid, with stirring at 25° C. for a period of 30 minutes, resulting in a dry, free flowing sustained release powder.

EXAMPLE XXIX 10 parts by weight of 50 Bloom pigskin gelatin is added to 90 parts by weight of water at a temperature of 150° F. The mixture is agitated until the gelatin is completely dissolved and the solution is cooled to 120° F. 20 parts by weight of the liquid grape flavor composition of Example III is added to the solution which is then homogenized to form an emulsion having particle size typically in the range of 2-5 microns. This material is kept at 120° F. under which conditions, the gelatin will not jell.

Coacervation is induced by adding slowly and uniformly, 40 parts by weight of a 20% aqueous solution of sodium sulphate. During coacervation the gelatin molecules are deposited uniformly about each oil droplet as a nucleus.

Gelation is effected by pouring the heated coacervate mixture into 1,000 parts by weight of 7% aqueous solution of sodium sulphate at 65° F. The resulting jelled coacervate may be filtered and washed with water at temperatures below the melting point of gelatin, to remove the salt.

Hardening of the filtered cake, in this example, is effected by washing with 200 parts by weight of 37% solution of formaldehyde in water. The cake is then washed to remove residual formaldehyde.

EXAMPLE XXX

Chewing Gum 100 parts by weight of chicle are mixed with 4 parts by weight of the flavor prepared in accordance with Example XXVIII. 300 Parts of sucrose and 100 parts of corn syrup are added. Mixing is effected in a ribbon blender with jacketed walls of the type manufactured by the Baker Perkins Co.

The resultant chewing gum blend is then manufactured into strips 1 inch in width and 0.1 inches in thickness. The strips are cut into lengths of 3 inches each. On chewing, the chewing gum has a pleasant, long lasting grape flavor.

EXAMPLE XXXI

Chewing Gum

100 Parts by weight of chicle are mixed with 18 parts by weight of the flavor prepared in accordance with Example XXIX. 300 Parts of sucrose and 100 parts of corn syrup are then added. Mixing is effected in a ribbon blender with jacketed walls of the type manufactured by the Baker Perkins Co.

The resultant chewing gum blend is then manufactured into strips 1 inch in width and 0.1 inches in thickness. The strips are cut into lengths of 3 inches each. On chewing, the chewing gum has a pleasant, long lasting grape flavor.

EXAMPLE XXXII

Toothpaste Formulation

The following separate groups of ingredients are prepared:

| Parts by Weight | Ingredient |
|---|---|
| Group "A" | |

-continued

| Parts by Weight | Ingredient |
|---|---|
| 30.200 | Glycerine |
| 15.325 | Distilled Water |
| .100 | Sodium Benzoate |
| .125 | Saccharin Sodium |
| .400 | Stannous Fluoride |
| Group "B" | |
| 12.500 | Calcium Carbonate |
| 37.200 | Dicalcium Phosphate (Dihydrate) |
| Group "C" | |
| 2.000 | Sodium N—Lauroyl Sarcosinate (foaming agent) |
| Group "D" | |
| 1.200 | Flavor Material of Example XXVIII |
| 100.00 - TOTAL | |

Procedure:

1. The ingredients in Group "A" are stirred and heated in a steam jacketed kettle to 160° F.
2. Stirring is continued for an additional three to five minutes to form a homogeneous gel
3. The powders of Group "B" are added to the gel, while mixing, until a homogeneous paste is formed
4. With stirring, the flavor of "D" is added and lastly the sodium-n-lauroyl sarcosinate
5. The resultant slurry is then blended for one hour. The completed paste is then transferred to a three roller mill and then homogenized, and finally tubed.

The resulting toothpaste, when used in a normal toothbrushing procedure yields a pleasant grape flavor, of constant strong intensity throughout said procedure (1-1.5 minutes).

EXAMPLE XXXIII

Chewable Vitamin Tablets

The flavor material produced according to the process of Example XXVIII is added to a Chewable Vitamin Tablet Formulation at a rate of 10 gm/Kg, which Chewable Vitamin Table Formulation is prepared as follows:

In a Hobart Mixer, the following materials are blended to homogeneity:

| Ingredients | Gms/1000 Tablets |
|---|---|
| Vitamin C (ascorbid acid) as ascorbic acid-sodium ascorbate mixture 1:1 | 70.11 |
| Vitamin $B_1$ (thiamine mononitrate) as Rocoat ® thiamine mononitrate 33⅓% (Hoffman La Roche) | 4.0 |
| Vitamin $B_2$ (riboflavin) as Rocoat ® riboflavin 33⅓% | 5.0 |
| Vitamin $B_6$ (pyridoxine hydrochloride) as Rocoat ® pyridoxine hydrochloride 33⅓% | 4.0 |
| Niacinamide as Rocoat ® niacinamide 33⅓% | 33.0 |
| Calcium pantothenate | 11.5 |
| Vitamin $B_{12}$ (cyanocobalamin) as Merck 0.1% in gelatin | 3.5 |
| Vitamin E (dl-alpha tocopheryl acetate) as dry Vitamin E acetate 33⅓% | 6.6 |
| d-Biotin | 0.044 |
| Flavor of Example XXVIII | (as indicated above) |
| Certified lake color | 5.0 |
| Sweetener - sodium saccharin | 1.0 |
| Magnesium stearate lubricant | 10.0 |

-continued

| Ingredients | Gms/1000 Tablets |
|---|---|
| Mannitol q.s. to make | 500.0 |

Preliminary tablets are prepared by slugging with flat-faced punches and grinding the slugs to 14 mesh. 13.5 g dry Vitamin A Acetate and 0.6 g Vitamin D are then added as beadlets. The entire blend is then compressed using concave punches at 0.5 g each.

Chewing of the resultant tablets yields a pleasant, long-lasting, consistently strong grape flavor for a period of 12 minutes.

EXAMPLE XXXIV

Grape Juice

The following grape flavor formulation is prepared:

| Ingredients: | Parts by Weight |
|---|---|
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| 2-phenyl-3-carboethoxyfuran | 1.5 |
| bis(cyclohexyl)disulfide | 1.5 |
| 1-n-butoxy-1-ethanol acetate produced according to Example I | 1.0 |

A grape juice concentrate is prepared from natural grape juice by vacuum evaporation process. A concentration of 46° Brix is obtained which is combinec with 100-fold natural grape essence in the ratio of 100:1. To this is added sufficient flavor as set forth above to provide a level of 100 ppm in the reconstituted grape juice prepared from the concentrate. The reconstituted grape juice produced using the above formulation is compared with natural grape juice and the reconstituted grape juice is found by a bench panel to be even more preferable than the natural grape juice particularly in its natural winey and fresh grape and "white" grape characteristics by a bench panel of three members.

What is claimed is:

1. A mixture comprising 1-n-butoxy-1-ethanol acetate and a composition of matter selected from the group consisting of 2-phenyl-3-carboethoxyfuran and bis(cyclohexyl)disulfide, the proportion of 1-n-butoxy-1-ethanol acetate:2-phenyl-3-carboethoxyfuran and/or bis(cyclohexyl)disulfide being from 0.1:1 up to 1:0.1.

2. The composition of matter of claim 1 comprising 1-n-butoxy-1-ethanol acetate, 2-phenyl-3-carboethoxyfuran and bis(cyclohexyl)disulfide, the weight ratio of 2-phenyl-3-carboethoxyfuran:bis(cyclohexyl)disulfide being in the range of from 1.5:0.02 up to about 1.5:0.15.

3. The process of augmenting or enhancing the aroma or taste of a grape flavored beverage or a grape flavored foodstuff or a grape flavored chewing gum or a grape flavored toothpaste or a grape flavored medicinal product comprising the step of adding thereto from 0.02 parts per billion up to about 0.1% by weight based on the total composition of the composition of matter claimed in claim 1.

4. The process of augmenting or enhancing the aroma or taste of a grape flavored beverage or a grape flavored foodstuff or a grape flavored chewing gum or a grape flavored toothpaste or a grape flavored medicinal product comprising the step of adding thereto from 0.02 parts per billion up to about 0.1% by weight based on the total composition of the composition of matter claimed in claim 2.

* * * * *